UNITED STATES PATENT OFFICE.

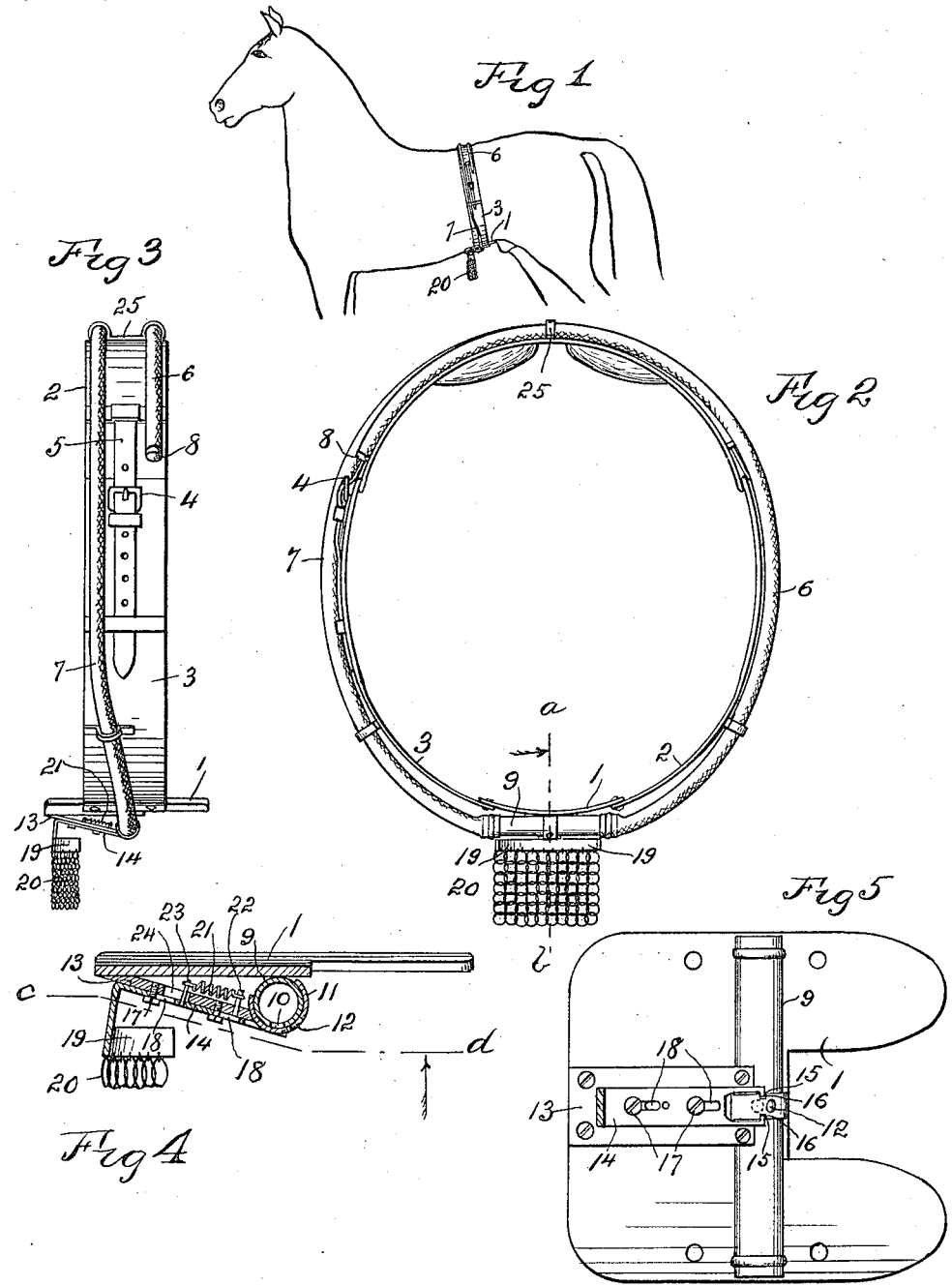

FRANK B. GRAHAM, OF KANSAS CITY, MISSOURI.

SPRAYING DEVICE.

1,075,562.  Specification of Letters Patent.  Patented Oct. 14, 1913.

Application filed July 5, 1910, Serial No. 570,360. Renewed May 29, 1913. Serial No. 770,795.

*To all whom it may concern:*

Be it known that I, FRANK B. GRAHAM, a citizen of the United States, residing at Kansas City, in the county of Jackson and State of Missouri, have invented certain new and useful Improvements in Spraying Devices, of which the following is a specification.

My invention relates to improvements in spraying devices.

It is particularly adapted for employment on male animals for the purpose of cooling certain organs and thereby reducing sexual desire of such animals.

The novel features of my invention are hereinafter more fully described and claimed.

In the accompanying drawings illustrative of the preferred form of my invention—Figure 1 is a side elevation showing my invention applied to a horse. Fig. 2 is an end elevation of the spraying device, detached from the animal. Fig. 3 is a side elevation of what is shown in Fig. 2. Fig. 4 is a vertical sectional view on the dotted line a—b of Fig. 2. Fig. 5 is a horizontal sectional view, on the broken dotted line c—d of Fig. 4.

Similar reference characters denote similar parts.

To support the apparatus upon the body of an animal, I provide a belt comprising a plate 1, to opposite edges of which are secured straps 2 and 3, the strap 3 being provided with a buckle 4 for engagement with a small strap 5, which is secured to the strap 2. The belt just described is adapted to be fastened around the body of the animal, as is illustrated in Fig. 1.

A vessel for containing a cooling fluid, such as cold water, is secured to and supported by the belt. This vessel preferably comprises two flexible tubes, 6 and 7, each provided at one set of ends with removable closures 8, the other ends being secured to opposite ends of the central tubular portion, comprising a horizontal tube 9, which is secured to the plate 1, and is provided in its lower side with an opening 10, for discharging the cooling fluid upon the copulatory organ of the male animal, to which the spraying device is attached. For normally closing the opening 10, I provide a valve, consisting preferably of a curved plate 11, fitted upon the periphery of the tube 9, in a position such that it will cover the whole of the opening 10. The valve 11 is provided with a hole 12, adapted to register with the opening 10 when the valve is moved to the open position. I provide mechanism by which the valve is moved to the open position through the intermediacy of the copulatory organ of the animal, at such times as said organ is extended. Preferably this mechanism consists of the following described parts:—Secured to the plate 1 and the tube 9, is an inclined plate 13, against the underside of which is mounted a forwardly and rearwardly inclined reciprocating plate 14, the rear end of which is provided with two inwardly extending fingers 15 which are respectively disposed in recesses 16, provided in opposite edges of the valve 11. Two screws 17 extend respectively through slots 18 in the plate 14 and have their upper ends secured in suitable openings provided in the plate 13. The forward end of the plate 14 supports a guard which is preferably constructed as follows:—The forward end of said plate 14 extends downwardly and at its lower end is provided with two curved horizontal arms 19, from which depend a net 20, which is disposed in position to be struck and forced forward by the animal's copulatory organ at such times as the organ becomes distended, due to sexual desire. At such times the organ will force the net 20 and plate 14 forwardly so as to uncover the opening 10 by the valve 11 being rotated to the open position. At such time the cooling fluid contained in the tube 9 will be discharged downwardly upon the organ so as to cool the same and cause it to be retracted from the net 20. For closing the valve 11 I preferably provide a coil spring 21, one end of which is secured to an upwardly extending pin 22, secured in the plate 13, the other end being secured to a pin 23, secured to the plate 14 and extending upwardly through a longitudinal slot 24, provided in the plate 13. Upon the pressure being removed from the rear side of the net 20, the spring 21 will retract the plate 14, thereby retracting the valve 11 to the closed position, shown in Fig. 4. To the strap 2 may be secured a plate 25 having on its under side two recesses, through which may be inserted respectively the free ends of the flexible tubes 6 and 7.

During hot weather any suitable cooling liquid, other than water, may be placed in the tubes 6 and 7, the closures 8 being removable for the purpose of filling said tubes.

With the employment of my invention the health of male animals may be better preserved and their excitability reduced.

When it is desired to remove the device from the animal the tube 7 is withdrawn from the plate 25 and the strap 5 detached from the buckle 4, thereby permitting the device to be removed.

Modifications of my invention, within the scope of the appended claims, may be made without departing from its spirit.

Having thus described my invention, what I claim and desire to secure by Letters Patent, is:—

1. In a spraying device, a vessel for containing fluid and having an opening for discharging the fluid upon the copulatory organ of a male animal, a valve controlling said opening, and means including a flexible net adapted to conform in shape to said organ and operative thereby for actuating said valve.

2. In a spraying device, a vessel for containing fluid and having a discharge opening through which fluid may be discharged upon the copulatory organ of a male animal, a valve controlling said opening, a movable member for actuating the valve and having a U shaped portion with the arms horizontally disposed, and a flexible device suspended from said U shaped portion and adapted to conform to the shape of and be moved by said organ for moving said movable member.

In testimony whereof I have signed my name to this specification in presence of two subscribing witnesses.

FRANK B. GRAHAM.

Witnesses:
E. B. HOUSE,
CHESTER THOMAS.

---

Copies of this patent may be obtained for five cents each, by addressing the "Commissioner of Patents, Washington, D. C."